(12) United States Patent
Lodge et al.

(10) Patent No.: US 7,886,613 B2
(45) Date of Patent: Feb. 15, 2011

(54) TRANSMISSION CHAIN MONITORING SYSTEM

(75) Inventors: Christopher James Lodge, Tintwistle (GB); Eduardo Abanses Enguita, Manchester (GB)

(73) Assignee: Renold PLC, Wythenshawe (GB)

( * ) Notice: Subject to any disclaimer, the term of this patent is extended or adjusted under 35 U.S.C. 154(b) by 0 days.

(21) Appl. No.: 12/552,009

(22) Filed: Sep. 1, 2009

(65) Prior Publication Data

US 2010/0005899 A1    Jan. 14, 2010

Related U.S. Application Data

(63) Continuation of application No. 11/996,338, filed as application No. PCT/GB2006/002383 on Jun. 28, 2006, now Pat. No. 7,634,949.

(30) Foreign Application Priority Data

Jul. 23, 2005    (GB) ................... 0515176.6

(51) Int. Cl.
    *G01N 3/08*    (2006.01)
(52) U.S. Cl. .......................... 73/828; 73/760
(58) Field of Classification Search ............ 73/760–828
    See application file for complete search history.

(56) References Cited

U.S. PATENT DOCUMENTS

| | | | |
|---|---|---|---|
| 1,528,154 A | 3/1925 | Laden | |
| 4,078,668 A | 3/1978 | Hohmann | |
| 4,106,005 A | 8/1978 | Asakawa | |
| 4,504,251 A | 3/1985 | Mittermeier | |
| 4,566,339 A | 1/1986 | Davidson et al. | |
| 5,224,388 A * | 7/1993 | Pratt | 73/862.632 |
| 5,272,924 A | 12/1993 | Tassic et al. | |
| 5,287,756 A * | 2/1994 | Tassic | 73/862.391 |
| 5,291,131 A | 3/1994 | Suzuki et al. | |
| 5,310,385 A | 5/1994 | Suzuki | |
| 5,370,584 A | 12/1994 | Todd | |
| 5,512,019 A | 4/1996 | Shimaya et al. | |
| 5,563,392 A | 10/1996 | Brown et al. | |
| 5,824,963 A | 10/1998 | Bruns et al. | |
| 5,908,363 A | 6/1999 | Suzuki | |
| 6,053,831 A | 4/2000 | Boedo | |
| 6,126,563 A | 10/2000 | Simpson | |
| 6,609,985 B2 | 8/2003 | Todd et al. | |
| 6,865,955 B2 * | 3/2005 | Nassar et al. | 73/828 |
| 7,331,891 B2 | 2/2008 | Poiret | |
| 7,634,949 B2 * | 12/2009 | Lodge et al. | 73/828 |

(Continued)

FOREIGN PATENT DOCUMENTS

DE    3524338    1/1987

(Continued)

*Primary Examiner*—Max Noori
(74) *Attorney, Agent, or Firm*—Michael Best & Friedrich LLP

(57) ABSTRACT

A method for detecting the strain applied to a transmission chain includes positioning a strain gauge on an inwardly-facing surface of a first of a pair of opposed outer link plates, spacing the inwardly-facing surface of the first outer link plate from an outwardly-facing surface of a first of a pair of opposed inner link plates facing the first outer link plate, connecting the strain gauge into a bridge network and an electric circuit, and using an output of the electric circuit to determine the strain applied to the chain.

24 Claims, 6 Drawing Sheets

U.S. PATENT DOCUMENTS

| | | |
|---|---|---|
| 2001/0003279 A1 | 6/2001 | Brandl et al. |
| 2004/0237662 A1 | 12/2004 | Nassar et al. |

FOREIGN PATENT DOCUMENTS

| | | |
|---|---|---|
| DE | 3832512 | 4/1990 |
| DE | 4103055 | 8/1992 |
| DE | 10155364 | 5/2003 |
| EP | 0348861 | 1/1990 |
| EP | 0351453 | 1/1990 |
| EP | 0467643 | 1/1992 |
| EP | 0795514 | 9/1997 |
| EP | 1067275 | 1/2001 |
| EP | 1227264 | 7/2002 |
| GB | 1484954 | 9/1977 |
| GB | 2041549 | 9/1980 |
| GB | 2377918 | 1/2003 |
| JP | 59043322 | 3/1984 |
| JP | 59078007 | 5/1984 |
| JP | 1022714 | 1/1989 |
| JP | 1038043 | 2/1989 |
| JP | 2130402 | 5/1990 |
| JP | 070101681 | 4/1995 |
| JP | 07172763 | 7/1995 |
| JP | 11182639 | 7/1999 |
| JP | 11201245 | 7/1999 |
| JP | 2002241072 | 8/2002 |
| SU | 1063739 | 12/1983 |
| WO | 02068310 | 9/2002 |

\* cited by examiner

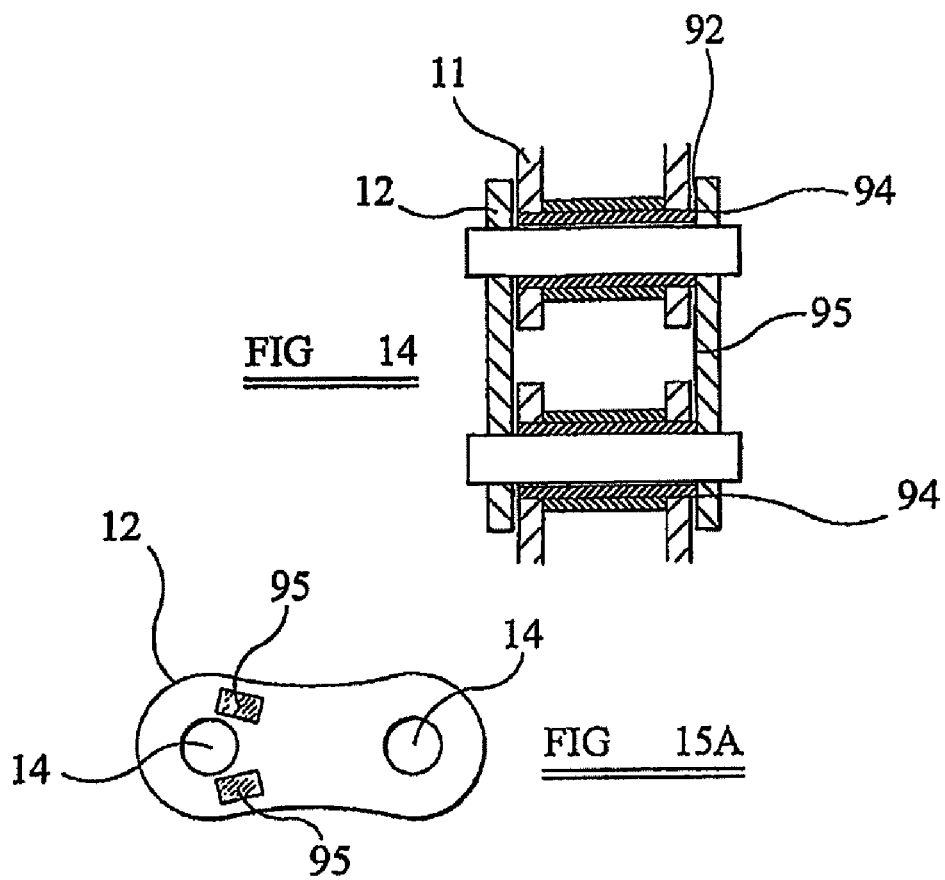
FIG 14
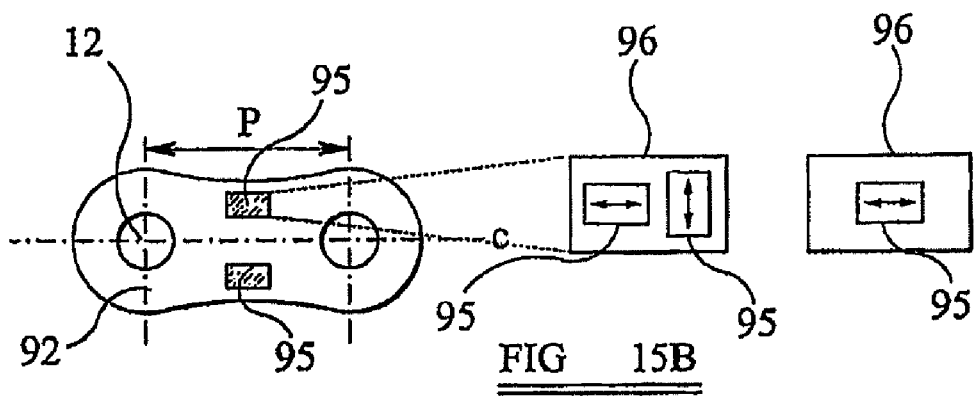
FIG 15A
FIG 15B
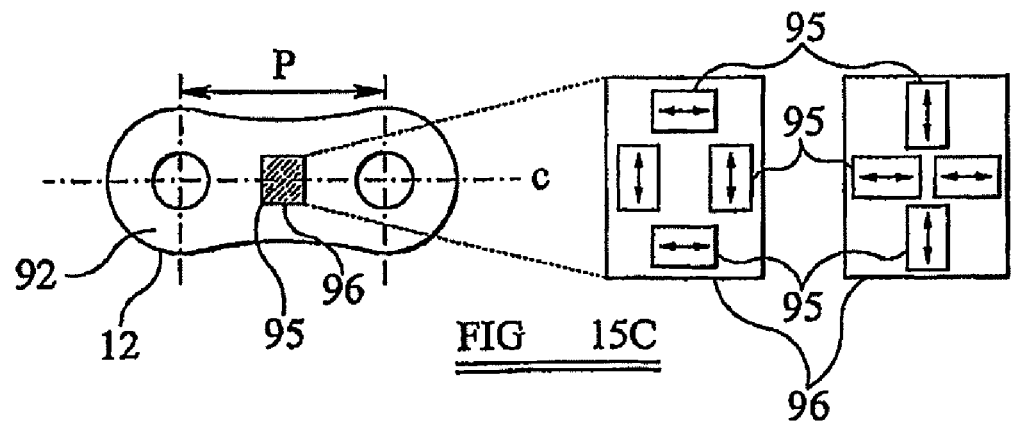
FIG 15C

TRANSMISSION CHAIN MONITORING SYSTEM

RELATED APPLICATIONS

This application is a continuation of co-pending U.S. patent application Ser. No. 11/996,338 filed on Jun. 28, 2006, the entire content of which is incorporated herein by reference.

BACKGROUND OF THE INVENTION

The present invention relates to monitoring systems for power transmission chains of the kind that are used in drive systems including those for lifting and conveying applications. Such chains generally comprise a plurality of link plates interconnected by transverse pins.

Chains of the kind referred to above are typically used to transfer power and/or forces and can often be subjected to fluctuating loads. When problems arise in the operation of the chain drive, it is often difficult to diagnose precisely what is causing the disruption or ultimately the failure of the drive. Clear and easy access to all parts of the drive may not be possible and this creates problems. In order to assist in the diagnosis it is known to use data logging and transfer devices. An example in relation to the load upon a fork-lift truck lifting chain is described in European Patent Application No. 1 362 003. This describes the mounting of a sensor and data-logging unit onto the surface of a link plate of a lift chain. The unit has strain gauges, associated electrical circuitry, memory, and a transceiver. The strain gauges and associated signal processing circuitry provide an output signal that is indicative of the load applied to the chain at any point in time. This data may be stored, processed, and analyzed in the unit before being transmitted by a transceiver for onward transmission to a computer. Alternatively, the data may be transmitted directly to the computer without processing or analysis. Once the data is available it can be processed and analyzed to assess the chain condition and to determine whether the chain needs servicing or replacing.

SUMMARY OF THE INVENTION

The present invention provides, in one aspect, a method for detecting the strain applied to a transmission chain. The transmission chain includes opposed pairs of inner link plates, opposed pairs of outer link plates overlapping the inner link plates, and transverse pins that pass through aligned apertures in the overlapping inner and outer link plates. The method includes positioning a strain gauge on an inwardly-facing surface of a first of the outer link plates, spacing the inwardly-facing surface of the first outer link plate from an outwardly-facing surface of a first of the inner link plates facing the first outer link plate, connecting the strain gauge into a bridge network and an electric circuit, and using an output of the electric circuit to determine the strain applied to the chain.

Other features and aspects of the invention will become apparent by consideration of the following detailed description and accompanying drawings.

BRIEF DESCRIPTION OF THE DRAWINGS

FIG. 14 is a sectioned plan view of a chain link of a roller chain configured for use with the present invention and illustrating the position of the strain gauges of the monitoring system.

FIG. 15A is a front view of chain link illustrating schematically the positioning of strain gauges in accordance with prior art.

FIGS. 15B and 15C are front views of a chain link illustrating schematically the positioning of strain gauges of the monitoring system in accordance with the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
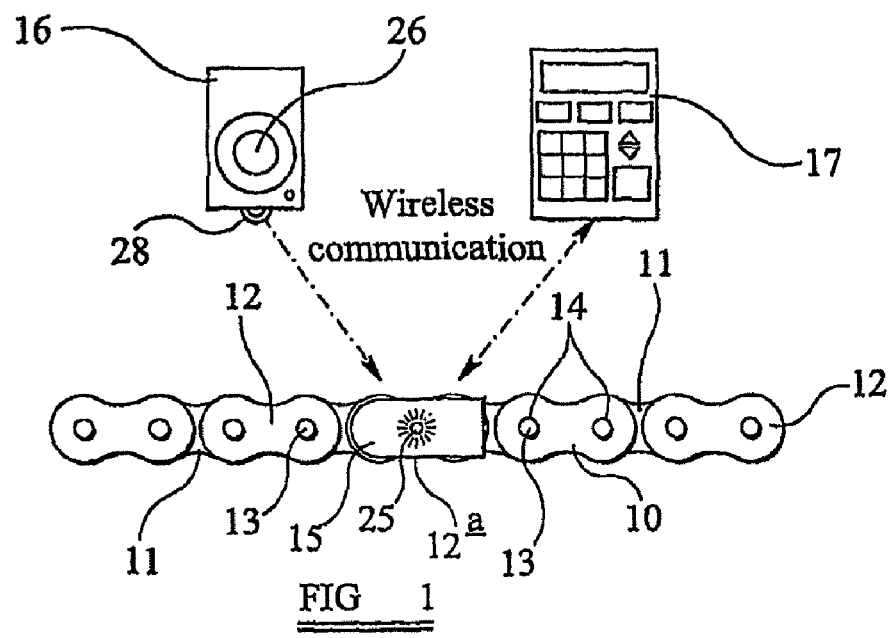
FIG. 1 is a diagrammatic representation an embodiment of the monitoring system of the present invention.

Referring now to FIG. 1 of the drawings, the exemplary monitoring system is shown in relation to a transmission chain 10 (only a part of which is shown) comprising inner and outer link plates 11, 12 arranged in opposed pairs, one of the pair being disposed on each side of the chain (only one side of the chain is shown in FIG. 1). The chain 10 is articulated as the link plates 11, 12 are pivotally interconnected by transverse pins 13 that pass through aligned pin holes 14 in the overlapping inner and outer link plates on each side. As is conventional in a chain of this kind, the pins 14 are designed to be an interference, or friction, fit with the outer link plates 12 but a clearance fit with the inner link plates 11 so that the latter are free to pivot on the pins 13 relative to the outer link plates 12.

In use as part of a chain drive assembly, such a chain 10 will be subjected to fluctuating tensile forces and therefore the plate material is subjected to stress and strain. The magnitude, frequency and pattern of such forces have an impact upon the chain wear, its fatigue strength and therefore it life expectancy.

One of the outer ink plates 12a of the transmission chain is fitted with a data collection device 15 that is provided with a visual indicator 25 and receiver and/or transmitter (hidden in FIG. 1) to enable communication by a wireless link with one of two controller types 16, 17. A first controller type 16 may be used simply to activate the data collection device 15 in a restricted mode of operation whereas a second controller type 17 of more sophisticated design can not only transmit information so as to configure and/or activate the device 15 but also can receive data collected by the device during or after operation of the chain 10 under load.

Figure 2:
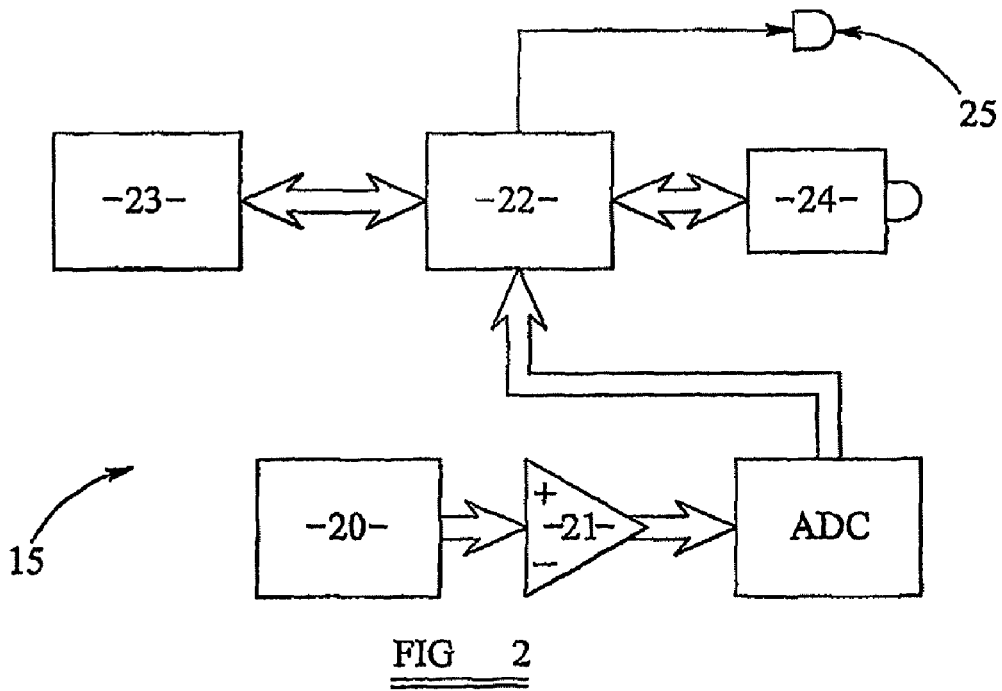
FIG. 2 is a block diagram of a data collection device forming part of the system of FIG. 1.

The data collection device 15 is shown in more detail in FIG. 2 and comprises a sensor 20 for detecting physical parameters associated with the chain. For example, the sensor 20 may comprise a strain gauge network that is bonded or otherwise fixed to the surface of the chain outer link plate 12a and generates analogue electrical output signals that are proportional to the elongation of the chain link plate 12a as a result of the chain load. The signals are therefore indicative of the load applied to the chain 10 at any point in time. Such signals are passed to signal processing circuitry including an amplifier 21 and are then converted into digital data by an Analog to Digital converter (ADC) and passed to a microcontroller device 22 that includes a processor. The data can be stored in a local memory 23 and/or transmitted when demanded by the controller 22 via an infra-red transmitter/receiver 24. The microcontroller 22 can be configured to perform a certain amount of data analysis locally and is connected to at least one visual indicator 25 that can indicate the status of the data collection device 15 and/or the condition of the chain 10 being monitored. A battery (not shown) is provided within the device to power the components.

It is to be understood that within the data collection device 15 any appropriate type of sensor 20 may be used to gather data relating to the chain condition. The strain gauge network is simply provided as one example embodiment of the sensor and other sensors such as, for example, temperature or vibration transducers may be used instead, or in combination with, the strain gauges.

Figure 3:
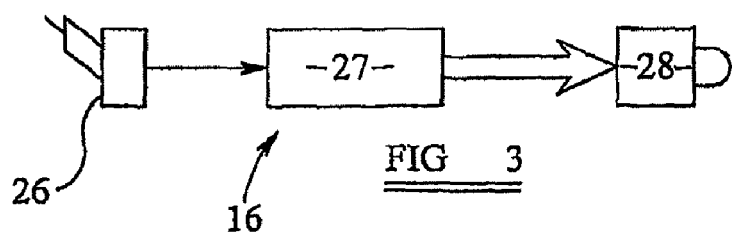
FIG. 3 is a block diagram of a first controller type forming part of the system of FIG. 1.
Figure 5A:
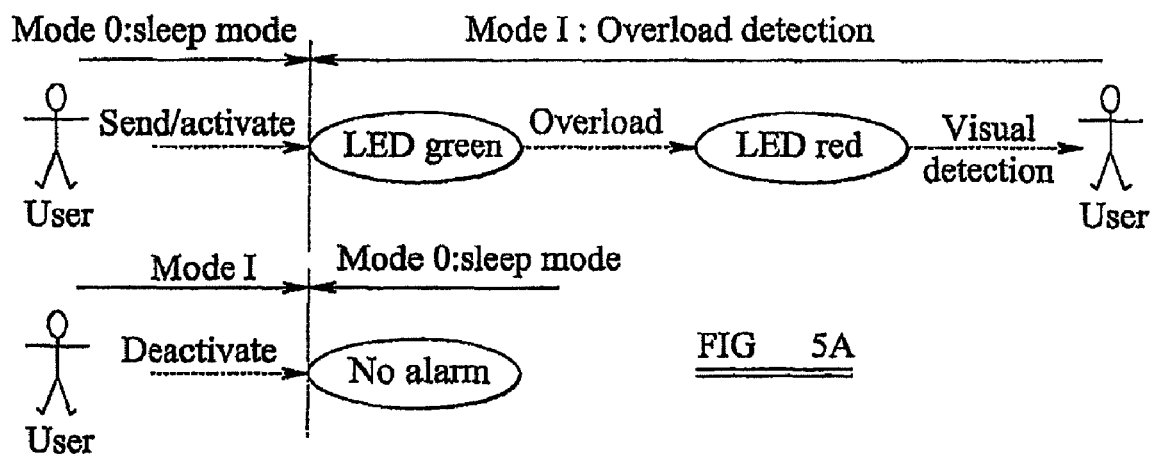
FIGS. 5A and 5B are diagrammatic representations of the operating modes of the system of FIG. 1.

The first controller type 16, shown in FIG. 1 and FIG. 3, is a simple small fob device that comprises a button switch 26, a logic circuit 27 and an infra-red transmitter 28. Ordinarily the data collection device 15 is in a quiescent stand-by or "sleep" mode (mode 0) where there is low power consumption (see FIG. 5A). Operating the switch transmits a signal to the data collection device 15 to switch it from the "sleep" mode (mode 0) to a first operative mode (mode 1) in which it simply compares the sensor output signal with a stored threshold value representing an upper limit of allowable chain load (or alternative parameter) and operates visual indicator (s) 25 (e.g., one or more LEDs). In the event that the load on the chain exceeds the allowed upper limit, the output signal exceeds the stored threshold value and a signal is generated by the microcontroller 22 to illuminate the LED 25 so as to serve as a visual alarm. In the mode of operation shown in FIG. 5A, the visual indicator has two LEDs of differing colors, one (e.g. green) being illuminated when the data collection device is in operation (i.e. in mode 1) and the chain load is below the allowable upper limit and the other LED (e.g. red) being illuminated when the chain is overloaded (also in mode 1). The button switch 26 is also used to deactivate the device by switching it from mode 1 to mode 0 as shown in the second part of FIG. 5A.

Figure 4:
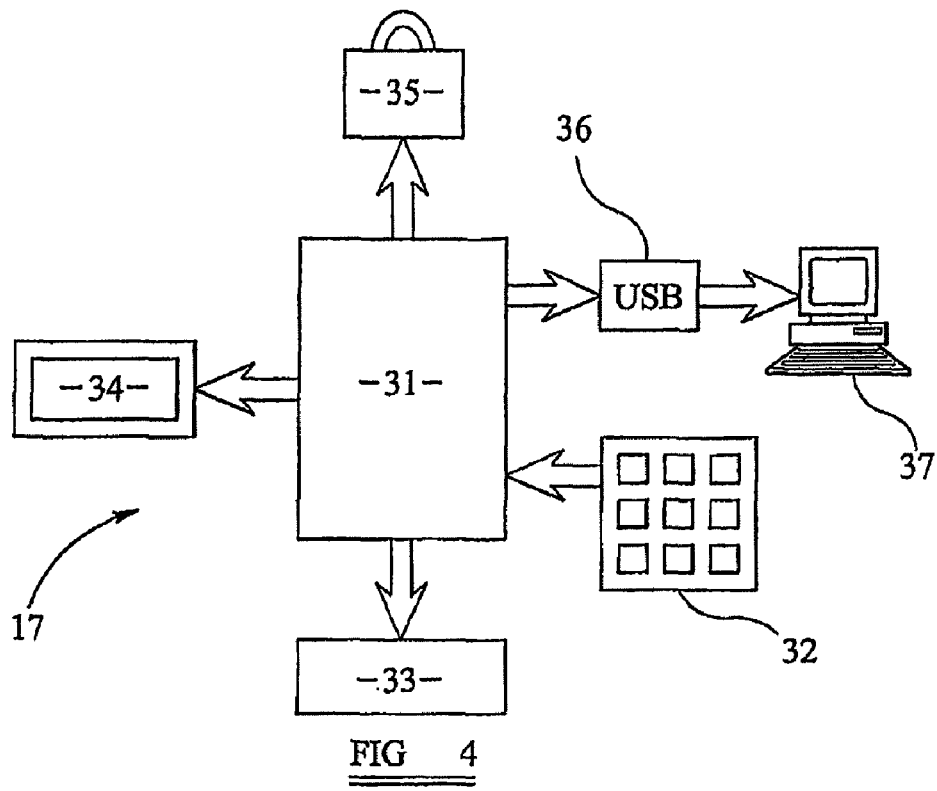
FIG. 4 is a block diagram of a second controller type forming part of the system of FIG. 1.
Figure 5B:
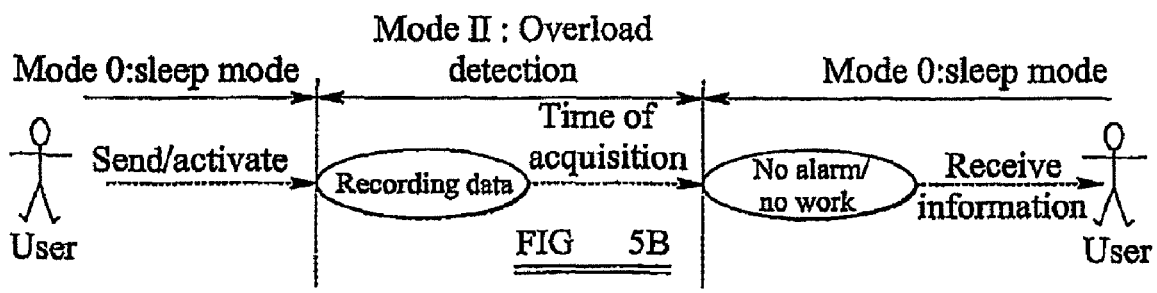

The second controller type 17, illustrated in FIG. 4, comprises a handheld unit having a microcontroller 31, a keypad 32, memory 33, an LCD display 34, an infra-red transmitter/receiver 35, and a connection 36 such as a USB connector for connection to a PC 37. With this controller 17 the data collection device 15 can operate as a data logger and capture operating data over a period of time. As illustrated in FIG. 5B, the controller 17 is used to switch the data collection device 15 from a stand-by state (mode 0) as before to a data-logging mode (mode 2) whereby the sensor output data is recorded and time stamped. In this mode of operation the LED 25 can be illuminated as described above in relation to first controller 16. After the data-logging operation, the device 15 can be switched back to mode 0. In mode 2, the data captured by the sensor 20 is transmitted via the infra-red transmitter/receiver 35 either in real time or after the event to the microcontroller 31 of the second controller type 17 and can be displayed on the LCD 34. A certain amount of processing and analysis of the data can be performed by the controller 31. Alternatively, or in addition, the data may be downloaded to a PC 37 for analysis or further analysis.

In practice, the transmission chain 10 can be supplied to a customer with the data collection device 15 fitted and accompanied with the first controller type 16. With this configuration of the monitoring system the customer is able identify when a chain has been overloaded by virtue of the visual indicator 25 on the chain 10 and take remedial action including, if necessary, replacing the chain 10. If the customer requires a more sophisticated system he can purchase a second controller type 17 without having to replace the chain 10 or the data collection device 15. With this second controller 17 the customer has access to more detailed information regarding chain performance and loading and is thus in a position to take more educated decisions in relation to the condition of the chain 10 and to determine whether the chain 10 needs servicing or replacing.

The second controller 17 of the data collection device 15 can be pre-loaded with data relating to the chain being analyzed such as, for example, its type, length, certification, and service history to date. This data may be pre-programmed into the memory 23, 33 associated with the processor of one or other of the microcontrollers 22, 31 before the chain is fitted to the drive. It may be entered from the keypad 32 of the second controller 17 or may be entered remotely from the PC 37.

The data can be analyzed, for example, to determine the average number of hours that the chain 10 has been used in a particular range of load magnitudes. This information is more meaningful and useful to a chain user, or the machine owner in which the chain drive is incorporated, than a simple indication of how long the chain 10 has been used and whether it has been overloaded. This is because for a significant proportion of the time in service the chain 10 may not be carrying any significant load, depending on the application.

The data can be analyzed to determine the number of times the load has exceeded a predetermined threshold and/or the absolute value of those loads. This enables the user to determine how many times the recommended chain load has been exceeded and the impact this has on the risk of chain failure. Analysis of the data may also assist in diagnosis of faults in the chain drive such as, for example, excessive start-up tension etc.

The service conditions of the chain 10 can be analyzed, for example, by applying Miner's Rule to the data collected so as to predict the remaining life span of the chain 10. This analysis involves the calculation of the fractional contribution to fatigue damage at each load level (and therefore stress level) in the load spectrum.

For example, the chain 10 may be part of a lifting chain assembly of a fork-lift truck which is leased by the owner to a lessee. In such circumstances the lessor can download information when the truck is returned after the hire period. Alternatively, the work conditions of the chain 10 can be monitored remotely during the use of the truck by means of a computer connected to a local or wide area network. The data stored in the memory can transmitted at periodic intervals to the lessor's computer network. The data is analyzed by a software routine running on the computer network so as to generate meaningful results.

If the data is processed in real time or at least after a relatively small time delay and it is determined that the chain fatigue life expectancy has been exceeded then not only can the visual alarm be activated but also, where safety is an issue the may be used to control a cutout circuit that is used disable the chain drive.

In an alternative configuration a fixed remote controller is provided in proximity to the circulating chain e.g. a frame or part of the machinery to which the chain forms a part. As the chain circulates the data collection device transmits data wirelessly as it passes in proximity to the remote monitor. Thus data can be collected in the remote controller at regular intervals where it may be processed or downloaded for processing at a suitable future time or date.

Figure 6:
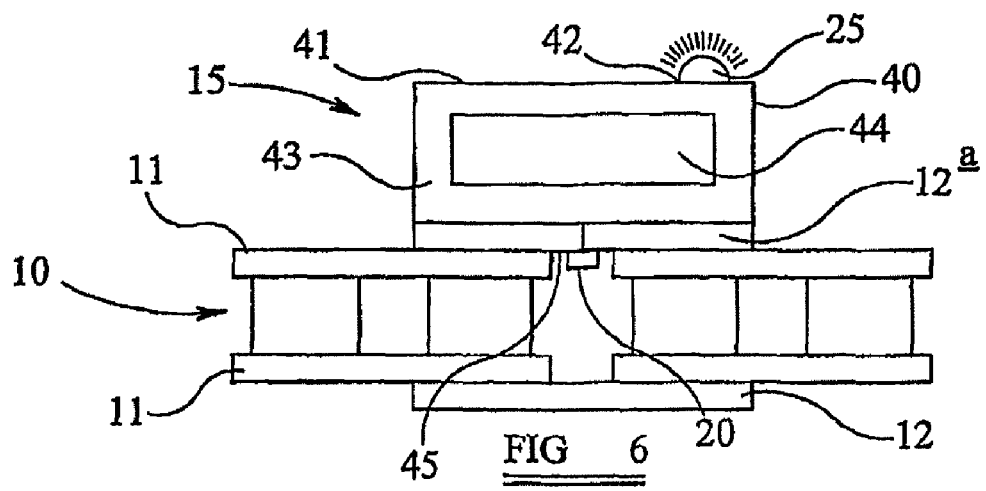
FIG. 6 is a schematic diagram illustrating part of a roller transmission chain with a data collection device mounted thereon and for use as part of the monitoring system of FIG. 1.

FIG. 6 is a schematic representation illustrating the mechanical structure of the data collection device 15 and its position on the chain 10. It can be seen that device has a housing 40 that encloses the components shown in FIG. 2 and which is mounted to the outer link plate 12a by a convenient fixing. The housing 40 has an outwardly facing wall 41 that is penetrated by at least one aperture 42 in which the LED(s) 25 is (are) disposed so as to be easily visible in use. An upper wall 43 of the housing 40 has a window 44 via which IR signals are transmitted. The sensor 20, in the form of a strain gauge network, is mounted on the inwardly facing surface 45 of the outer link 12a and is connected to electronic signal processing circuitry (21, ADC etc.) within the housing 40.

Figure 7:
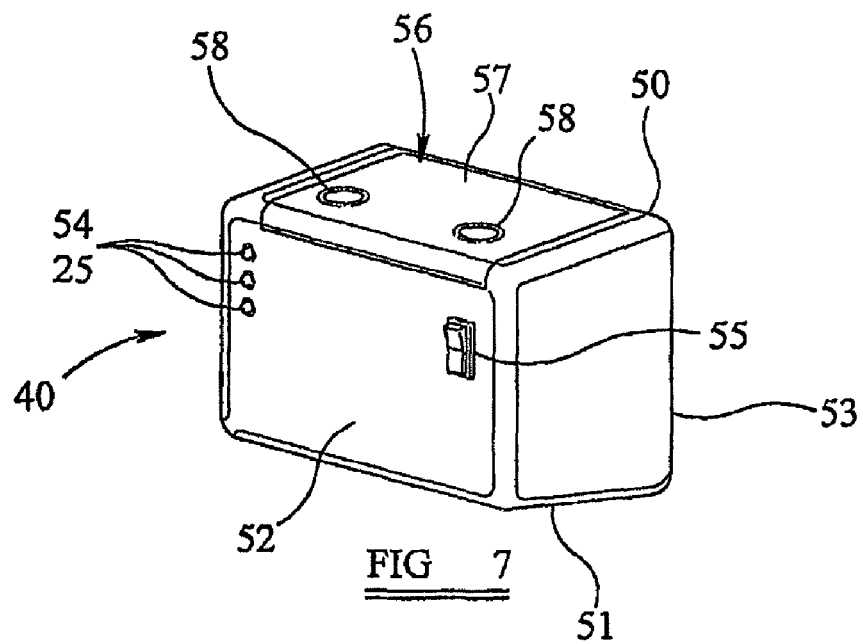
FIG. 7 is a perspective view of an embodiment of a housing for the data collection device of FIG. 6.

FIG. 7 shows an exemplary housing 40 having upper 50, lower 51, front 52, and side walls 53. The front wall 51 has three apertures 54 that each receives an LED 25 of the data collection device 15, and a slot for accommodating a manual override switch 55 of the device. The housing 40 is adapted to be connected to an outer link by means of an L-shaped connector bracket 56 having a first planar plate (hidden) whose plane extends in parallel to the outer link plate 11 (and therefore the front wall 52 of the housing 40) and is connected to the outer link plate 11 by any appropriate fixing means and a perpendicular plate 57 that is fixed to the upper wall 50 of the housing 40 by clips 58.

Figure 8:
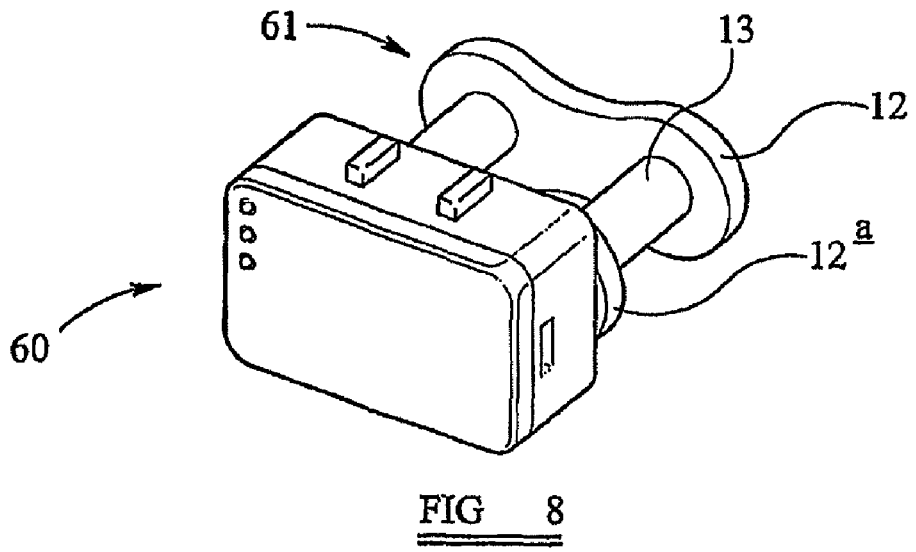
FIG. 8 is a perspective view of an alternative embodiment of the data collection device housing mounted on a transmission chain link.

An alternative housing and connection arrangement is shown in FIG. 8. In this figure the housing 60 is depicted with a single chain link 61 and only the outer link plates 12, 12a and pins 13 are shown. The pins 13 are extended in length compared to those of a conventional chain such that they project laterally beyond the plane of one of the outer link plates 12a and are connected to a suitable retaining structure (hidden) fixed inside the housing 60.

Figure 9:
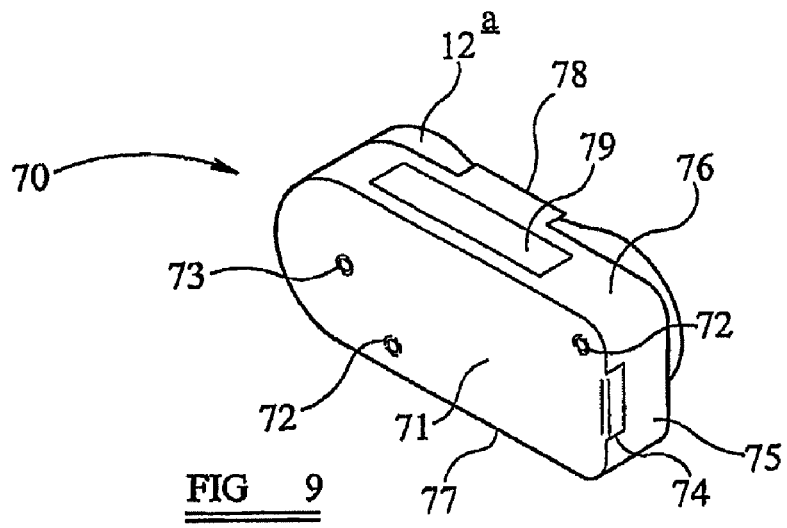
FIG. 9 is a perspective view of a further alternative embodiment of the housing of the data collection device shown mounted on a transmission chain link.

In the housing embodiment 70 of FIG. 9 the front wall 71 is removable to obtain access to the interior of the data collection device 15. The wall is penetrated by two fixing holes 72 and an LED aperture 73. A clip mechanism 74 also serves to secure the front wall 71 to one of the side walls 75. The upper and lower walls 76, 77 each have a rearwardly protruding clip 78 (only one shown, the other being hidden) that connects to the periphery of an outer link plate 12a. As in the embodiment of FIG. 6, the upper wall 76 has a window 79 to allow the passage of infra red signals.

Figure 10:
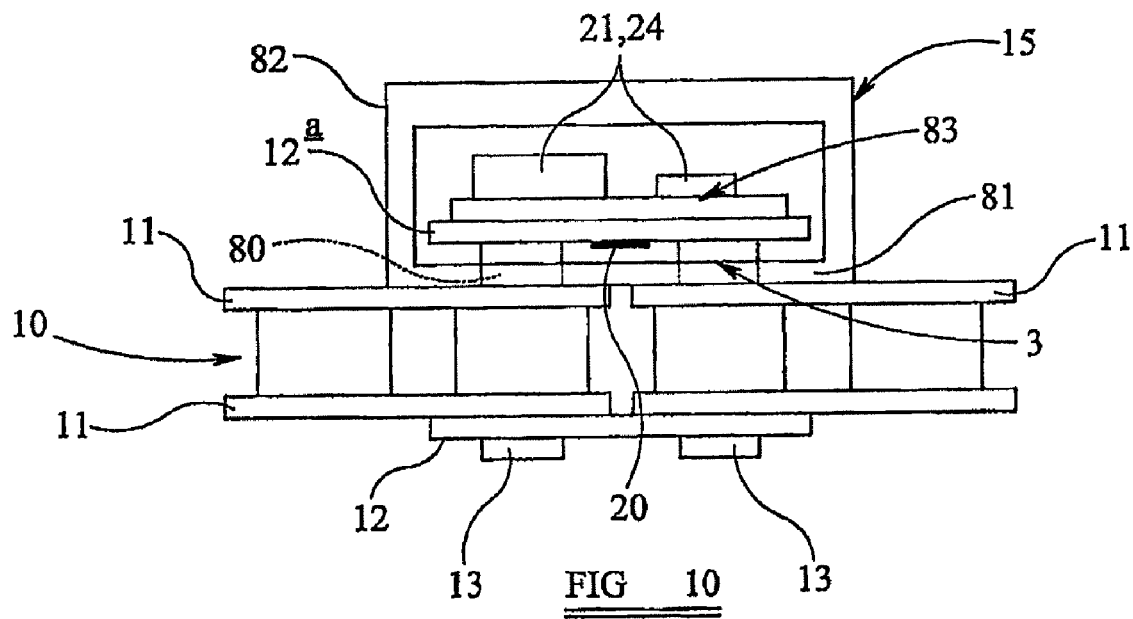
FIGS. 10 and 11 are sectioned plan views of a part of a roller transmission chain and the data collection device.
Figure 11:
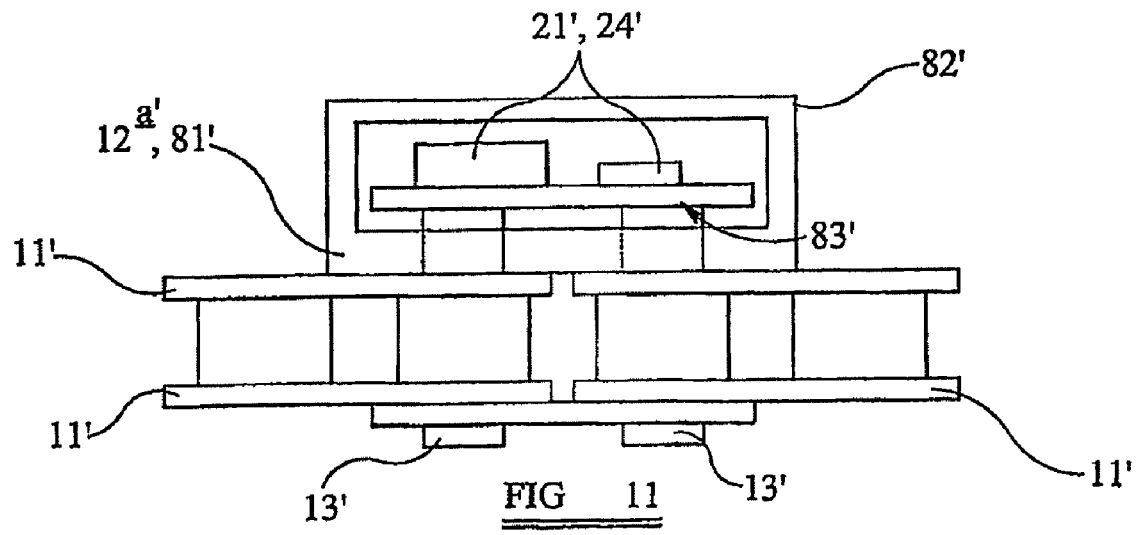
Figures 12A, 12B:
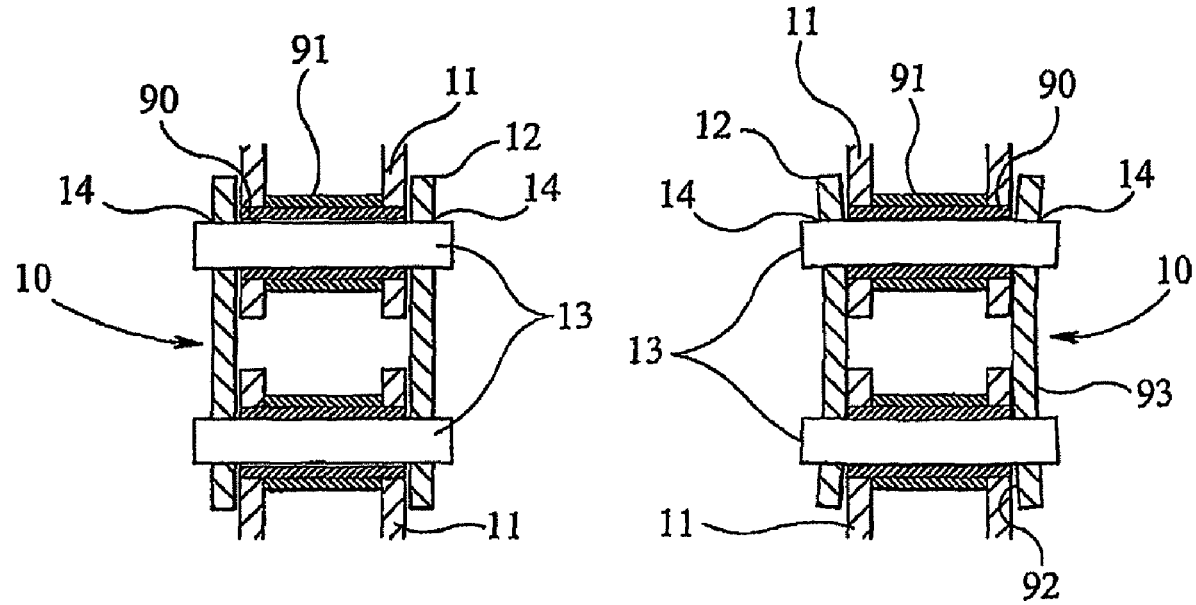
FIGS. 12A and 12B are sectioned plan views of a prior art roller transmission chain shown, respectively, unloaded and under load, the figures serving to illustrate the bending load on the chain pins and outer link plates when the chain is in use.

Further embodiments of the connection and structure of the data collection device 15 and its housing are shown in FIGS. 10 and 11 in relation to a roller bush chain 10. In FIG. 10, the chain outer link plate 12a that supports the device 15 has pins 13 that are extended in comparison to a standard link and are received in a pair of apertures 80 in a rear wall 81 of the housing 82. The outer link plate 12a is mounted on to the end of the extended pins 13 is fully enclosed within the housing 82. The outer link plate 12a supports a board 83 on which the electronic components 21 to 24 of the data collection device 15 are mounted with the exception of the strain gauge sensors 20 which are fixed directly to the outer link plate 12a. It will be noted that the visual indicator is not shown in this particular figure. In FIG. 11 a rear wall 81' of the housing 82' serves also as the outer link plate 12a' and therefore the extended pins 13' pass therethrough. The mounting board 83' for the electronic components 21' to 24' is supported on the ends of the pins 13'. Again the visual indicator is not shown in this figure.

The strain gauges used in the present invention are of conventional design in that they each comprise a very fine metallic wire whose electrical resistance varies in proportion to the amount of strain to which it is subjected. The gauges are typically mounted on a substrate that is bonded or to the link plate. The substrate may take the form of, for example, a film, foil or silicon wafer. The strain experienced by the link plate to which the substrate is fixed is transferred directly to the strain gauges. To measure the small changes in resistance of the gauges they are arranged in a conventional bridge network such as a Wheatstone Bridge where each gauge forms an arm of the bridge network and an excitation supply voltage. Any change in resistance of a gauge is reflected in a non-zero output voltage.

Figure 13:
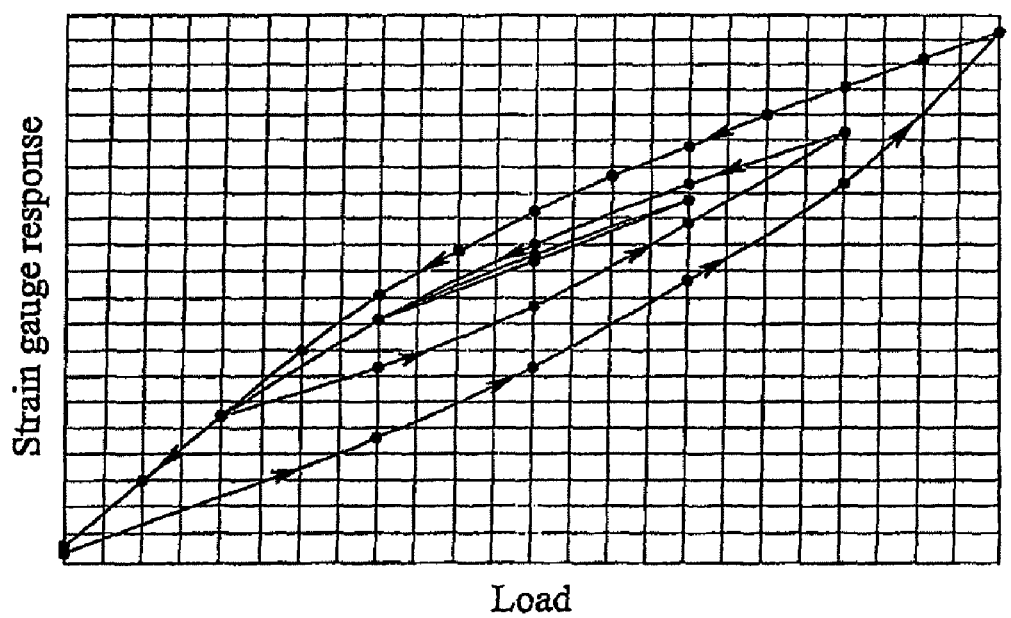
FIG. 13 is a graph illustrating strain gauge response with load when mounted on the outside of the outer link plate of chain of FIGS. 12A and 12B.

FIGS. 12 to 15 relate to the positioning of the strain gauge sensors 20 on the chain link plate. FIGS. 12A and 12B show part of a prior art roller chain 10 in an unloaded and loaded condition respectively. The chain 10 comprises opposed outer link plates 12 alternating along the length of the chain 10 with opposed inner link plates 11 and being pivotally connected therewith by transverse pins 13 that pass through aligned pin hole apertures 14 in overlapping plates 11, 12. A bush 90 extends between opposed apertures 14 in the inner link plates 11 on each side and receives a transverse pin 13. A cylindrical roller 91 is rotatably mounted on the bush 90. It will be seen from a comparison of the two figures that when the chain 10 is loaded in tension the pins 13 are subjected to a bending moment. This in turn affects the load distribution on the outer link plates 12 which also bend outwardly as shown. It has been observed that the bending of the outer link plates 12 in this way serves to increase the tensile stress on the inwardly facing surface 92 of the outer link plates 12 and reduces the tensile stress on the outwardly facing surface 93. The net effect on the tensile force and the bending moment on the outer link plates 12 is dependent on the geometry of the chain 10 and for certain link chain sizes the result is that there is almost no strain on the outer face 93 of the outer link plate 12. During fluctuating loading of the chain 10 it has been observed that there is a significant amount of hysteresis in the response of a strain gauge mounted on the outer face 93 of a link plate 12, as depicted in the graph of FIG. 13 which plots chain load against strain gauge response for a fluctuating load. This can cause ambiguity in the measure values of the chain load since it is dependent on whether the load is increasing or decreasing and by what rate.

It has been discovered that by positioning the gauges on the inwardly facing surface 92 of the outer link plate 12 the distortions to the reading referred to above are obviated or significantly mitigated.

In order to avoid damage to the strain gauges when mounted on the inside surface 92 of the outer link 12 the latter has to be mounted such that it is clear of rubbing contact with the outer surface of the inner link plates 11. This may be achieved by, for example, using the housing configurations shown in FIGS. 10 and 11 or by adopting a bush 94 that extends beyond the inner link plate 11 at least on the side of the chain where the gauges 95 are mounted as shown in FIG. 14.

The conventional position of strain gauges 95 on an outer chain link plate 12 is shown in FIG. 15A alongside FIGS. 15B and 15C, which illustrate the positions in accordance with the present invention. The position illustrated in FIG. 15A is the most intuitive since it is close to the pins holes 14 where tensile stress tends to be concentrated. However, if the bush 94 of FIG. 14, or an alternative spacer, is used it would rub against the gauges 95. Moreover, if the gauges 95 are to be fixed to the inner surface 92 of the outer link plate 12 this has to be done before the plate is attached to the pins 13 otherwise it is very difficult if not impossible to achieve in view of the confined space. The act of connecting the outer link plate 12 to the pins 13 with an interference fit induces residual stress into the plate 12 (i.e. stress in the plate material without any chain load applied) in the area around the holes 14 thereby unbalancing the strain gauge network and distorting the readings. It has been found by the applicant that placing the gauge network 95 equidistant the centers of the pin holes 14, i.e. midway along the chain pitch P, the performance of the gauges 95 is not deleteriously affected and the residual stress from the interference fit of the pins 13 does not significantly affect the balance of the gauge network.

As is conventional, the gauges 95 are arranged into a Wheatstone Bridge network with each gauge forming one arm of the bridge network as described above. The bridge is excited by a supply voltage derived from the battery and the output voltage is representative to the strain on the link plate. For a full bridge network the gauges are arranged into two sets of two, the gauges of each set being arranged orthogonally. This is shown in FIG. 15C where the gauges 95 are arranged on to a single substrate 96, with two alternative gauge arrangements on that film being depicted to the right of that figure. The stain gauge substrate 96 is arranged on the center line c of the link plate 12 equidistant from the pin hole centers 14. The arrows illustrate the direction of strain to which the particular gauge 95 is responsive. It will be seen that two of the gauges that detect strain in the same direction are disposed on the center line of the chain 10 whereas the other two are disposed such that they are symmetrically disposed about the centerline c and a line that extends perpendicular to the center line c at the position mid-way along the pitch distance P.

In FIG. 15B an alternative strain gauge configuration is depicted in which the two sets of gauges 95 are arranged symmetrically about the center line c of the link plate 12. This can be on the same or separate substrates 96. In the inset diagrams to the right it can be seen that each set of gauges 95 is arranged into a half bridge network (with two gauges) or may simply be a single gauge.

It will be appreciated that numerous modifications to the above described design may be made without departing from the scope of the invention as defined in the appended claims. For example, any appropriate form of sensor or transducer may be used as an alternative to a strain gauge for sensing any appropriate physical condition of the chain besides stress or strain e.g. temperature, vibration etc.

What is claimed is:

1. A method for detecting the strain applied to a transmission chain, the transmission chain including opposed pairs of inner link plates, opposed pairs of outer link plates overlapping the inner link plates, and transverse pins that pass through aligned apertures in the overlapping inner and outer link plates, the method comprising:
    positioning a strain gauge on an inwardly-facing surface of a first of the outer link plates;
    spacing the inwardly-facing surface of the first outer link plate from an outwardly-facing surface of a first of the inner link plates facing the first outer link plate;
    connecting the strain gauge into a bridge network and an electric circuit; and
    using an output of the electric circuit to determine the strain applied to the chain;
    wherein spacing the inwardly-facing surface of the first outer link plate from the outwardly-facing surface of the first inner link plate includes inserting a bushing through the aligned apertures in the opposed pairs of inner link plates, the bushing protruding from the outwardly-facing surface of the first inner link plate.

2. The method of claim 1, wherein positioning the strain gauge includes positioning a plurality of strain gauges on the inwardly-facing surface of the first outer link plate.

3. The method of claim 2, wherein positioning the plurality of strain gauges includes mounting the strain gauges symmetrically about a center line of the first outer link plate.

4. The method of claim 3, further comprising
    arranging the strain gauges into at least two sets, and
    sensing strain in mutually orthogonal directions with the at least two sets of strain gauges.

5. The method of claim 2, wherein positioning the plurality of strain gauges includes positioning at least two strain gauges configured to sense strain in the same direction equidistant from the center of the apertures of the first outer link plate.

6. The method of claim 2, wherein positioning the plurality of strain gauges includes positioning at least two strain gauges configured to sense strain in the same direction equidistant from a center line aligned with the apertures of the first outer link plate.

7. The method of claim 2, wherein positioning the plurality of strain gauges includes positioning at least two strain gauges configured to sense strain in the same direction on a center line aligned with the apertures of the first outer link plate.

8. The method of claim 7, wherein positioning the at least two strain gauges includes positioning the at least two strain gauges midway along a pitch length of the chain.

9. The method of claim 7, wherein positioning the at least two strain gauges includes positioning the at least two strain gauges symmetrically about a line that is perpendicular to the center line of the first outer link plate and that intersects the center line midway along a pitch length of the chain.

10. The method of claim 1, wherein positioning the strain gauge includes mounting at least two strain gauges in the bridge network on the same outer link plate.

11. The method of claim 1, wherein positioning the strain gauge includes positioning at least two strain gauges configured to sense strain in the same direction midway along a pitch length of the chain.

12. The method of claim 1, wherein spacing the inwardly-facing surface of the first outer link plate from the outwardly-facing surface of the first inner link plate includes spacing the strain gauge from the outwardly-facing surface of the first inner link plate to prevent damage to the strain gauge.

13. A method for detecting the strain applied to a transmission chain, the transmission chain including opposed pairs of inner link plates, opposed pairs of outer link plates overlapping the inner link plates, and transverse pins that pass through aligned apertures in the overlapping inner and outer link plates, the method comprising:
positioning a strain gauge on an inwardly-facing surface of a first of the outer link plates;
spacing the inwardly-facing surface of the first outer link plate from an outwardly-facing surface of a first of the inner link plates facing the first outer link plate;
connecting the strain gauge into a bridge network and an electric circuit; and
using an output of the electric circuit to determine the strain applied to the chain;
wherein spacing the inwardly-facing surface of the first outer link plate from the outwardly-facing surface of the first inner link plate includes spacing the strain gauge from the outwardly-facing surface of the first inner link plate to prevent damage to the strain gauge.

14. The method of claim 13, wherein spacing the inwardly-facing surface of the first outer link plate from the outwardly-facing surface of the first inner link plate includes inserting a bushing through the aligned apertures in the opposed pairs of inner link plates, the bushing protruding from the outwardly-facing surface of the first inner link plate.

15. The method of claim 13, wherein positioning the strain gauge includes positioning a plurality of strain gauges on the inwardly-facing surface of the first outer link plate.

16. The method of claim 15, wherein positioning the plurality of strain gauges includes mounting the strain gauges symmetrically about a center line of the first outer link plate.

17. The method of claim 16, further comprising arranging the strain gauges into at least two sets, and sensing strain in mutually orthogonal directions with the at least two sets of strain gauges.

18. The method of claim 15, wherein positioning the plurality of strain gauges includes positioning at least two strain gauges configured to sense strain in the same direction equidistant from the center of the apertures of the first outer link plate.

19. The method of claim 15, wherein positioning the plurality of strain gauges includes positioning at least two strain gauges configured to sense strain in the same direction equidistant from a center line aligned with the apertures of the first outer link plate.

20. The method of claim 15, wherein positioning the plurality of strain gauges includes positioning at least two strain gauges configured to sense strain in the same direction on a center line aligned with the apertures of the first outer link plate.

21. The method of claim 20, wherein positioning the at least two strain gauges includes positioning the at least two strain gauges midway along a pitch length of the chain.

22. The method of claim 20, wherein positioning the at least two strain gauges includes positioning the at least two strain gauges symmetrically about a line that is perpendicular to the center line of the first outer link plate and that intersects the center line midway along a pitch length of the chain.

23. The method of claim 13, wherein positioning the strain gauge includes mounting at least two strain gauges in the bridge network on the same outer link plate.

24. The method of claim 13, wherein positioning the strain gauge includes positioning at least two strain gauges configured to sense strain in the same direction midway along a pitch length of the chain.

* * * * *